(12) United States Patent
Wang et al.

(10) Patent No.: US 10,318,918 B2
(45) Date of Patent: Jun. 11, 2019

(54) RECORDING DEVICE, SYSTEM AND METHOD

(71) Applicants: BOE TECHNOLOGY GROUP CO., LTD., Beijing (CN); BOE (HEBEI) MOBILE DISPLAY TECHNOLOGY CO., LTD., Gu'An (CN)

(72) Inventors: Guiyun Wang, Beijing (CN); Jiangwei Li, Beijing (CN)

(73) Assignees: BOE Technology Group Co., Ltd., Beijing (CN); BOE (Hebei) Mobile Display Technology Co., Ltd., Gu'An (CN)

( * ) Notice: Subject to any disclaimer, the term of this patent is extended or adjusted under 35 U.S.C. 154(b) by 107 days.

(21) Appl. No.: 14/894,836

(22) PCT Filed: Apr. 17, 2015

(86) PCT No.: PCT/CN2015/076834
§ 371 (c)(1),
(2) Date: Nov. 30, 2015

(87) PCT Pub. No.: WO2016/078315
PCT Pub. Date: May 26, 2016

(65) Prior Publication Data
US 2016/0292623 A1    Oct. 6, 2016

(30) Foreign Application Priority Data

Nov. 20, 2014    (CN) .......................... 2014 1 0671040

(51) Int. Cl.
*G09G 3/36*     (2006.01)
*G06Q 10/08*    (2012.01)

(52) U.S. Cl.
CPC ......... *G06Q 10/087* (2013.01); *G09G 3/3648* (2013.01); *G09G 2370/042* (2013.01)

(58) Field of Classification Search
CPC .............. G06Q 10/087; G06Q 20/203; G09G 2370/042
See application file for complete search history.

(56) References Cited

U.S. PATENT DOCUMENTS

| | | | | |
|---|---|---|---|---|
| 9,336,745 | B2 * | 5/2016 | Choi | ................ G09G 5/006 |
| 2004/0136343 | A1 * | 7/2004 | Lee | ................... H04J 13/16 |
| | | | | 370/335 |

(Continued)

FOREIGN PATENT DOCUMENTS

| CN | 101329855 | 12/2008 |
|---|---|---|
| CN | 101345833 | 1/2009 |

(Continued)

OTHER PUBLICATIONS

Office Action from corresponding Chinese Application No. 201410671040.9 (8 pages).

*Primary Examiner* — Allen C Chein
(74) *Attorney, Agent, or Firm* — Harness, Dickey & Pierce, P.L.C.

(57) ABSTRACT

Embodiments of the invention provide a recording device, which comprises a recording unit, a management unit and a storage unit, wherein the management unit is arranged to generate an identification code and write the identification code into the storage unit, the storage unit is arranged to store the identification code, and the recording unit is arranged to read the identification code from the storage unit and record the identification code into TFT display module. The recording device can record the unique code for each TFT display module to uniquely distinguish different TFT display modules, thereby facilitating tracking and adjustment of parameters, such as color and the like, of an installed TFT display terminal. On the other hand, the recording device can simplify a large amount of complex marking (Continued)

work, and guarantee that the TFT display modules would not be identified mistakenly while saving manpower and material resources.

14 Claims, 3 Drawing Sheets

(56) References Cited

U.S. PATENT DOCUMENTS

| | | | | |
|---|---|---|---|---|
| 2004/0186949 A1* | 9/2004 | Liu | ............ | G06F 9/44573 711/104 |
| 2005/0063416 A1* | 3/2005 | Shin | ............ | H04L 69/32 370/465 |
| 2005/0086398 A1* | 4/2005 | Chuang | ............ | G09G 5/006 710/16 |
| 2007/0236503 A1* | 10/2007 | Yin | ............ | G06F 3/14 345/520 |
| 2007/0252808 A1* | 11/2007 | Kao | ............ | G09G 5/006 345/104 |
| 2008/0100604 A1* | 5/2008 | Du | ............ | G09G 3/006 345/205 |
| 2008/0134237 A1* | 6/2008 | Tu | ............ | H04N 5/44543 725/38 |
| 2008/0238903 A1* | 10/2008 | Wang | ............ | G09G 5/003 345/204 |
| 2008/0302865 A1* | 12/2008 | Tseng | ............ | G09G 5/003 235/375 |
| 2008/0307118 A1* | 12/2008 | Tseng | ............ | G06F 3/1423 710/8 |
| 2008/0307199 A1* | 12/2008 | Tseng | ............ | G09G 5/003 712/37 |
| 2008/0307200 A1* | 12/2008 | Tseng | ............ | G09G 5/003 712/37 |
| 2009/0027409 A1* | 1/2009 | Kao | ............ | G09G 5/006 345/543 |
| 2009/0031054 A1* | 1/2009 | Kato | ............ | G06F 13/385 710/22 |
| 2009/0085930 A1* | 4/2009 | Shoya | ............ | G06F 3/147 345/619 |
| 2009/0122033 A1* | 5/2009 | Park | ............ | G06F 1/3203 345/204 |
| 2009/0292978 A1* | 11/2009 | Miyama | ............ | G06F 11/1008 714/807 |
| 2010/0017613 A1* | 1/2010 | Chen | ............ | G07F 7/1016 713/172 |
| 2010/0171747 A1* | 7/2010 | Bae | ............ | G09G 5/006 345/531 |
| 2011/0285676 A1* | 11/2011 | Lin | ............ | G06F 3/1423 345/204 |
| 2012/0038833 A1* | 2/2012 | Dong | ............ | H04N 7/173 348/725 |
| 2013/0050084 A1* | 2/2013 | Soffer | ............ | G06F 3/023 345/163 |
| 2013/0050251 A1* | 2/2013 | Suzuki | ............ | G06F 3/1423 345/619 |
| 2013/0113697 A1* | 5/2013 | Chang | ............ | G06F 3/1431 345/156 |
| 2014/0078160 A1* | 3/2014 | Yang | ............ | G09G 5/001 345/531 |
| 2014/0118382 A1* | 5/2014 | Qiu | ............ | G09G 5/003 345/565 |
| 2014/0139500 A1* | 5/2014 | Kimura | ............ | G09G 5/12 345/204 |
| 2015/0234770 A1* | 8/2015 | Koyanagi | ............ | G06F 13/4081 710/302 |
| 2015/0317938 A1* | 11/2015 | Fujioka | ............ | G09G 3/2092 345/212 |
| 2016/0110303 A1* | 4/2016 | Wei | ............ | G06F 13/4221 710/308 |

FOREIGN PATENT DOCUMENTS

| | | | | |
|---|---|---|---|---|
| CN | 101604500 | | 12/2009 | |
| CN | 101719354 | | 6/2010 | |
| CN | 101719356 | | 6/2010 | |
| CN | 102129828 | | 7/2011 | |
| CN | 102522119 | | 6/2012 | |
| CN | 202916551 | | 5/2013 | |
| CN | 103679230 A | | 3/2014 | |
| CN | 104318949 | | 1/2015 | |
| CN | 104318949 A | * | 1/2015 | ............ G09G 3/36 |
| JP | 2007-333931 | | 12/2007 | |
| WO | WO 2016078315 A1 | * | 5/2016 | ............ G09G 3/36 |

* cited by examiner

| SUPPLIER CODE | ADDRESS CODE OF STORAGE UNIT | SERIAL CODE OF TFT DISPLAY MODULE |
|---|---|---|
| ID1:bit7~bit5 | ID1:bit4~bit2 | ID1:bit1~ID3:bit0 |
FIG. 4
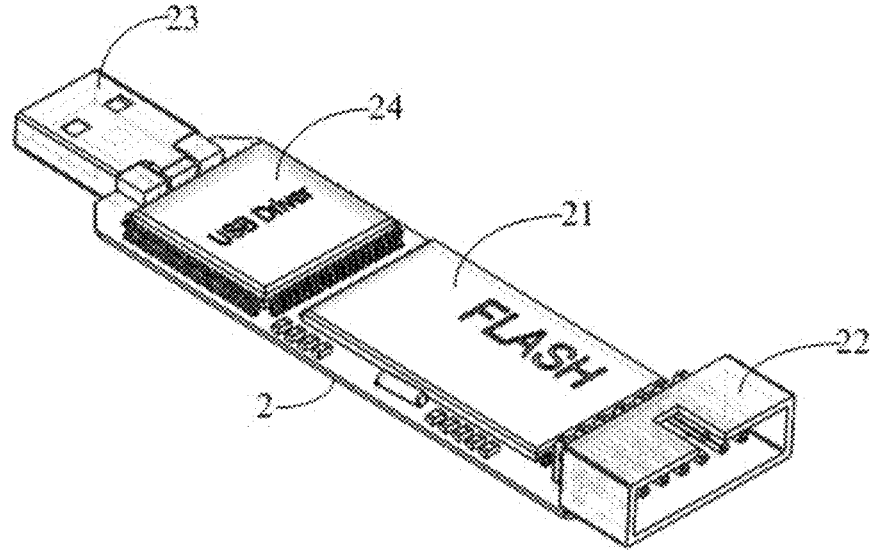
FIG. 5
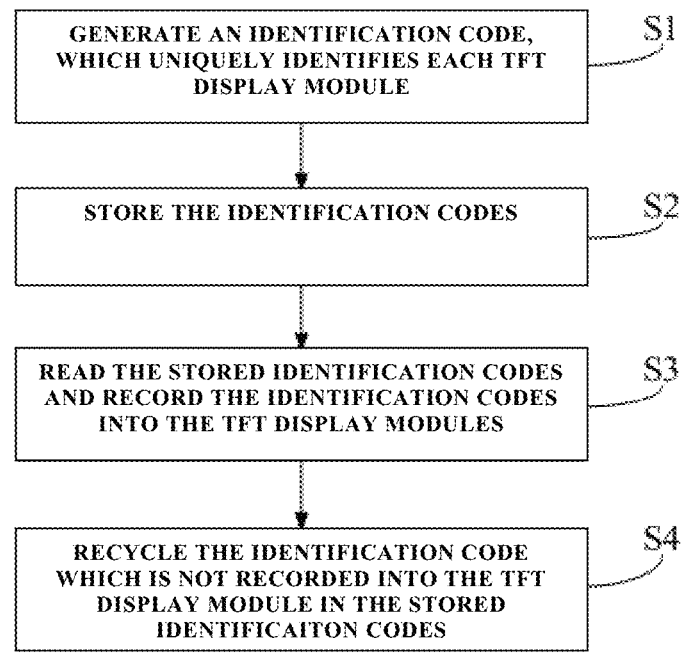
FIG. 6

RECORDING DEVICE, SYSTEM AND METHOD

TECHNICAL FIELD

The present invention relates to the technical field of liquid crystal display manufacture, and more particularly, to a recording device, recording system and recording method.

BACKGROUND

Liquid crystal display (LCD) device has become a mainstream product in the current flat-panel displays because of its small size, low power consumption, no radiation, etc.

LCD module (i.e., display panel) is a key component in the LCD device. In the manufacturing process, LCD module is usually coded or marked to facilitate subsequent tracking and adjustment of parameters, such as color and the like, of an installed LCD terminal based on different manufacturing conditions for the LCD module.

Currently, the different manufacturing conditions for the LCD module are distinguished based on different suppliers thereof. Traditionally, for the LCD terminal, a supplier code is written into a drive chip of the LCD module so as to distinguish different suppliers of LCD module. The supplier code is recorded into a code register reserved in the drive chip by a recording device. For the same supplier, the recording device records the code of the supplier into all of the LCD modules supplied by this supplier. That is, the codes of all the LCD modules supplied by this supplier are the same, which results in that each LCD module does not have a unique code for distinction, such that it is impossible to distinguish each LCD module from others after the LCD device is installed, and thus it is difficult to track and adjust the parameters such as color of each installed LCD terminal.

In order to facilitate tracking and adjustment of the parameters such as color of each installed LCD terminal based on the different manufacturing conditions of the LCD modules, test engineers attempt to mark each LCD module and each LCD terminal. However, such marking affects appearance of the LCD terminal, and also causes some problems, such as increasing the amount of work for the engineers and complicating the data processing and so on, when there is a huge number of LCD modules and LCD terminals.

SUMMARY

Embodiments of the present invention provide a recording device, recording system and recording method. The recording device can record a unique identification code for each thin-film-transistor (TFT) display module to uniquely distinguish different TFT display modules, thereby facilitating tracking and adjustment of parameters, such as color and the like, of an installed TFT display terminal (e.g. a mobile terminal) greatly. Further the recording device can simplify a large amount of complex marking work, and guarantee that the TFT display modules would not be identified mistakenly while saving manpower and material resources.

According to an embodiment of the present invention, there is provided a recording device for recording an identification code for a TFT display module, each identification code identifying the TFT display module, each TFT display module having the identification code which uniquely corresponds to the TFT display module, the recording device comprising a recording unit, a management unit and a storage unit, wherein the management unit is arranged to generate the identification code and write the identification code into the storage unit, the storage unit is arranged to store the identification code, and the recording unit is arranged to read the identification code from the storage unit and record the identification code into the TFT display module.

In an embodiment, the recording unit is arranged to read one identification code from the storage unit for each time and record the identification code into the TFT display module.

In an embodiment, the recording unit may include a read module, a recording module and a write module, wherein the read module is connected with the recording module; the write module is connected with the storage unit, and the read module and the recording module are further arranged to connect, respectively, with the TFT display module, wherein the read module is arranged to read the identification code at the initial address from the storage unit, and send the read identification code to the recording module;

wherein the recording module is arranged to receive the identification code and record the identification code into the TFT display module; and wherein the write module is arranged to increment the identification code written into the TFT display module by one and write the incremented identification code into the initial address of the storage unit.

In an embodiment, the recording unit may further comprise a registration module and a comparison module, wherein the read module is further connected with the registration module and the comparison module, respectively, and the registration module, the recording module and the write module are connected, respectively, with the comparison module, wherein the read module is further arranged to send the identification code read from the storage unit to the registration module when sending it to the recording module, and the read module is further arranged to read, from the TFT display module, the identification code recorded into the TFT display module, and send the identification code recorded into the TFT display module to the comparison module;

wherein the registration module is arranged to receive and temporarily store the identification code read by the read module, and send the temporarily stored identification code to the comparison module;

wherein the comparison module is arranged to compare the identification code recorded into the TFT display module and the identification code temporarily stored in the registration module, and send the comparison result to the write module and the recording module;

wherein the write module is arranged to increment, if the comparison result indicates consistency, the identification code at the initial address by one, and write the incremented identification code into the initial address; and wherein the recording module is further arranged to record the received identification code into the same TFT display module if the comparison result indicates inconsistency.

In an embodiment, the storage unit comprises a storage module and a first interface connected with the storage module, wherein the storage module is arranged to store the identification code, the first interface is further connected with the recording unit, and the recording unit is arranged to read the identification code from the storage module via the first interface.

In an embodiment, the storage unit further includes a second interface connected with the management unit and the storage module, respectively, wherein the management unit is arranged to write the generated identification code into the storage module via the second interface.

In an embodiment, the storage unit further comprises a conversion module connected between the second interface and the storage module, arranged to convert a transmission format and data format of the identification code written by the management unit via the second interface into formats acceptable to the storage module, so that the identification code can be written into the storage module.

In an embodiment, the management unit is further arranged to read the identification code which is not recorded into the TFT display modules from the storage module via the second interface, and the conversion module is further arranged to convert the transmission format and data format of the identification code read from the storage module into formats acceptable to the management unit, so that the identification code can be read into the management unit.

In an embodiment, the recording device comprises a plurality of the storage units and a plurality of the recording units, wherein the plurality of the storage units are one-to-one connected with the plurality of the recording units, and the respective storage units are arranged to store a plurality of the identification codes.

In an embodiment, the management unit comprises a personal computer (PC) or a single-chip microcomputer, the storage module includes a flash memory chip, the first interface is an I2C interface, the second interface is a USB interface, and the recording unit and the TFT display module are connected with each other via an mobile industry processor interface (MIPI).

In an embodiment, the management unit may include an address allocation module which is arranged to allocate a fixed address to each of the storage units based on a total number of the storage units, and allocate a serial number to each of the storage units based on a total number of the TFT display modules, wherein the identification code comprises the fixed address of the storage unit which stores the identification code and the serial number of the TFT display module which receives the identification code.

In an embodiment, the management unit is arranged to check, after all of the TFT display modules are recorded with the corresponding identification codes, whether there is any identification code remained in the storage units, and the management unit is arranged to recycle the identification code which is not recorded into the TFT display modules from the storage units.

According to another embodiment of the present invention, there is provided a recording system, comprising a recording device discussed above.

According to anther embodiment of the present invention, there is provided a recording method, comprising the steps of:

generating an identification code, each identification code identifying a TFT display module, and each TFT display module having the identification code which uniquely corresponds to the TFT display module;

storing the identification code; and reading the stored identification codes and recording the identification codes into the TFT display modules.

In an embodiment, in the step of reading the stored identification code and recording the identification code into the TFT display module, one of the stored identification codes is read for each time and the read identification code is recorded into the corresponding TFT display module.

In an embodiment, the step of reading the stored identification code and recording the identification code into the TFT display module comprises:

Step S31: reading the identification code at the initial address from the stored identification codes;

Step S32: temporarily storing the identification code;

Step S33: recording the identification code into the TFT display module; and

Step S35: incrementing the identification code at the initial address by one and writing the incremented identification code into the initial address.

In an embodiment, the step of reading the stored identification codes and recording the identification codes into the TFT display module further comprises:

Step S34: reading the recorded identification code from the TFT display module, and comparing the recorded identification code with the temporarily stored identification code, and performing Step S35 if the comparison result indicates consistency, and performing Step S33 if the comparison result indicates inconsistency.

In an embodiment, the recording method further comprises recycling the identification code which is not recorded into the TFT display module in the stored identification codes.

In an embodiment, in the step of storing the identification code, the identification code is stored into the storage units; and wherein the step of generating the identification code comprises:

determining a total number of the storage units for storing the identification codes;

allocating a fixed address to each of the storage units;

allocating a serial number to each of the storage units based on a total number of the TFT display modules; and generating the identification code which comprises the fixed address of the storage unit which stores the identification code and the serial number of the TFT display module which receives the identification code.

The recording device according to some embodiments of the present invention, by arranging the management unit and the storage unit, can record the unique identification code for each TFT display module to uniquely distinguish different TFT display modules, thereby facilitating tracking and adjustment of the parameters, such as color and the like, of an installed TFT display terminal (e.g. mobile terminal) greatly. Further the recording device can simplify a large amount of complex marking work, and guarantee that the TFT display modules would not be identified mistakenly while saving manpower and material resources.

The recording method according to some embodiments of the present invention can record a unique identification code for each TFT display module, to uniquely distinguish different TFT display modules, thereby facilitating tracking and adjustment of parameters, such as color and the like, of an installed TFT display terminal (e.g. a mobile terminal) greatly. Further the recording device can simplify a large amount of complex marking work and guarantee that the TFT display modules would not be identified mistakenly while saving manpower and material resources.

The recording system according to some embodiments of the present invention can utilize the recording device discussed above to uniquely distinguish different TFT display modules, and save manpower and material resources, and improve recording efficiency.

BRIEF DESCRIPTION OF THE DRAWINGS

FIG. 4 is a diagram illustrating the stored contents in the three identification code registers in FIG. 3;

FIG. 5 is a schematic structure diagram of the storage unit in FIG. 1;

FIG. 6 is a flowchart of the recording method according to embodiment 1 of the present invention.

REFERENCE NUMBERS

1: Management Unit; 2: Storage Unit; 21: Storage Module; 22: First Interface; 23: Second Interface; 24: Conversion Module; 3: Recording Unit; 31: Read Module; 32: Registration Module; 33: Recording Module; 34: Comparison Module; 35: Write Module; and 4: TFT Display Module.

DETAILED DESCRIPTION

The recording device, recording system and recording method according to the embodiments of the present invention will be described in detail in conjunction with the drawings to make those skilled in the art better understand the embodiments of the present invention.

Embodiment 1

Figure 1:
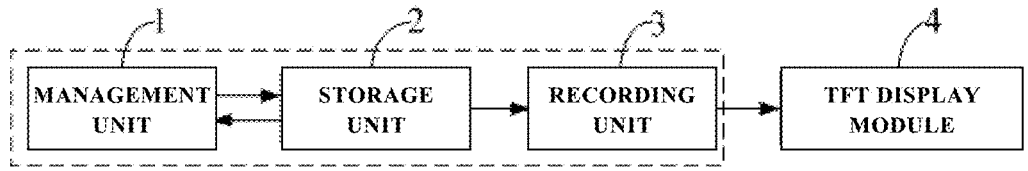
FIG. 1 is a principle block diagram of the recording device according to embodiment 1 of the present invention.

The embodiment provides a recording device for recording an identification code to the TFT display modules 4, as shown in FIG. 1. The identification code may identify the TFT display module 4. Each TFT display module has an identification code uniquely corresponding to the TFT display module. The recording device comprises a recording unit 3, a management unit 1 and a storage unit 2. The management unit 1 may generate the identification code and write the identification code into the storage unit 2. The storage unit 2 may store the identification code. The recording unit 3 may read the identification code from the storage unit 2 and record the identification code into the TFT display module 4.

Arrangement of the management unit 1 and storage unit 2 enables the recording device to record the unique identification code for each TFT display module 4, so as to uniquely distinguish different TFT display modules 4 and facilitate the tracking and adjustment of the parameters such as color of the installed TFT display terminal (e.g. mobile terminal) greatly; and further simplify a large amount of complex marking work and guarantee that the TFT display module 4 would not be identified mistakenly while saving manpower and material resources.

In the embodiment, the recording unit 3 may read one identification code from the storage unit 2 for each time and record the identification code into the TFT display module 4. In this way, one identification code can only be recorded into one TFT display module 4 to avoid erroneous correspondence between the identification code and the TFT display module 4 during the recording process, while facilitating a flow process of recording the identification code into the TFT display module 4.

Figure 2:
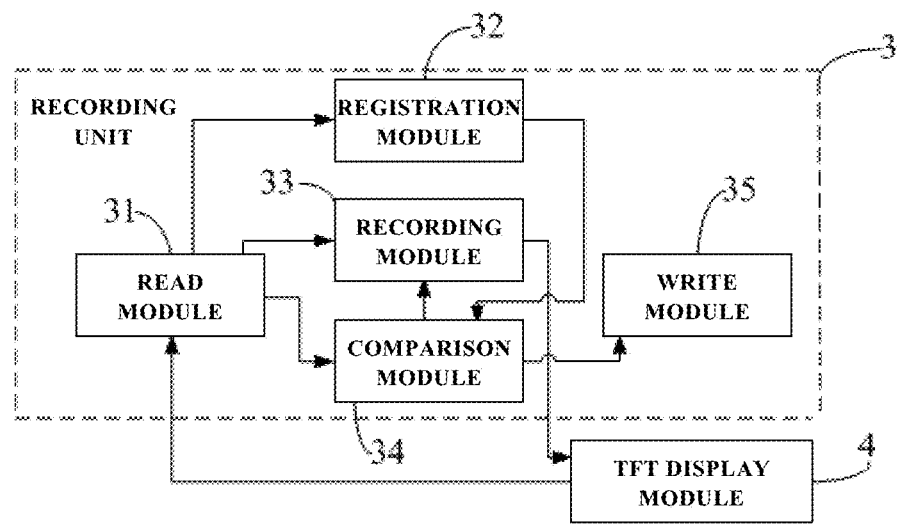
FIG. 2 is a principle block diagram of the recording unit in FIG. 1.

In the embodiment, as shown in FIG. 2, the recording unit 3 may comprise a read module 31, a recording module 33 and a write module 35. The read module 31 is connected with the recording module 33. The read module 31 and the recording module 33 are connected, respectively, with the TFT display module 4. The write module 35 is further connected with the storage unit 2.

The read module 31 may read the identification code at an initial address from the storage unit 2, and send the read identification code to the recording module 33. The recording module 33 may receive the identification code and record the identification code into the TFT display module 4. The write module 35 may increment the identification code at the initial address by one and write the incremented identification code into the initial address of the storage unit 2.

To avoid writing the erroneous identification code into the TFT display module, the recording unit 3 may further comprise a registration module 32 and a comparison module 34. The read module 31 is further connected with the registration module 32 and the comparison module 34, respectively. The registration module 32, the recording module 33 and the write module 35 are connected, respectively, with the comparison module 34.

The read module 31 may further send the identification code read from the storage unit 2 to the registration module 32 when sending it to the recording module 33. And the read module 31 may further read the identification code recorded into the TFT display module from the TFT display module, and send the identification code recorded into the TFT display module to the comparison module 34.

The registration module 32 is arranged to receive and temporarily store the identification code read by the read module 31, and further arranged to send the temporarily stored identification code to the comparison module 34.

The comparison module 34 is arranged to compare the identification code recorded into the TFT display module and the identification code temporarily stored in the registration module 32, and send the comparison result to the write module 35 and the recording module 33.

The write module 35 is arranged to increment, if the comparison result indicates consistency, the identification code at the initial address by one, and write the incremented identification code into the initial address.

The recording module 33 is further arranged to record the received identification code into the same TFT display module if the comparison result indicates inconsistency.

In the embodiment, the recording device may comprise a plurality of storage units 2 and a plurality of recording units 3. The plurality of storage units 2 are one-to-one connected with the plurality of the recording units 3. The respective storage units 2 may store a plurality of identification codes. In this way, the plurality of recording units 3 can simultaneously record the TFT display modules 4, and guarantee the uniqueness of the identification code of each TFT display module 4, so as to improve the recording efficiency.

The management unit 1 first determines a total number of the TFT display modules 4, into which the identification codes need to be recorded, and a total number of the recording units 3. The total number of the recording units 3 is same as a total number of the storage units 2. The management unit 1 may include an address allocation module which is arranged to allocate a fixed address to each of the storage units 2 based on the total number of the storage units 2, and allocate a certain number of serial numbers to each storage unit 2 based on the total number of the TFT display modules 4. For example, the address 0-F (binary code) is allocated to 16 storage units 2, and a 17-bits serial number (0000-1FFFF, binary code) is allocated to each storage unit 2.

Figure 3:
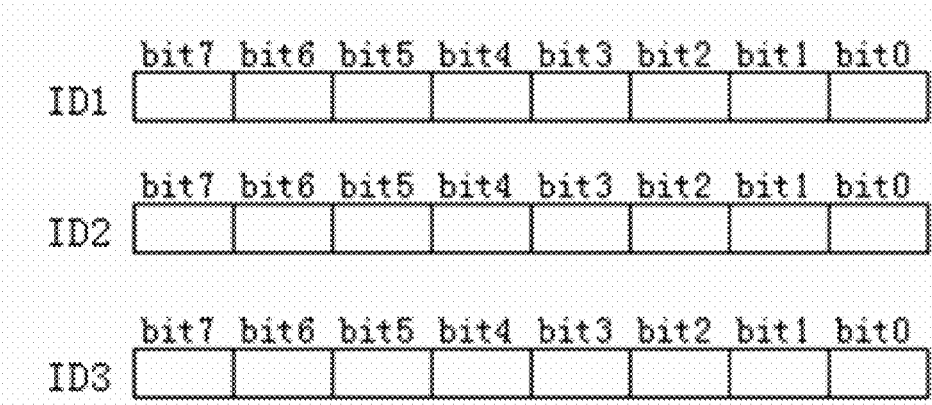
FIG. 3 is an illustrative structure diagram of three identification code registers in the drive chip of the TFT display module in the embodiment 1 of the present invention.

In the embodiment, as shown in FIGS. 3 and 4, each identification code, written into the storage unit 2 by the management unit 1, has 24 bits. The recording module 33 may record the 24-bits identification code into three identification code registers (ID1, ID2, ID3) of the drive chip of the TFT display module 4. Each identification code register consists of 8 bits of binary code and all 24 bits of binary code in the three registers form one identification code. The $5^{th}$ bit to $8^{th}$ bit of binary code in the first register (ID1) represent a supplier code; the $2^{nd}$ bit to $4^{th}$ bit of binary code in the first register (ID1) represent an address code of the storage unit 2; and the $1^{st}$ bit of binary code in the first register (ID1) to the $0^{th}$ bit of binary code in the third register (ID3) represent a serial code of the TFT display module 4. The serial code may be a code with a difference of 1 between any two adjacent codes in an ascending order.

In the embodiment, the management unit 1 may write the identification codes at the initial address and the end address into the storage unit 2, and the read module 31 of the recording unit 3 may read the identification code at the initial address from the storage unit 2 for each time. If the comparison result of the comparison module 34 indicates consistency, it represents that the recorded identification code is successfully recorded into the TFT display module 4. At this time, the identification code at the initial address is incremented by one and then the incremented identification code is written into the initial address to indicate that the last identification code is recorded successfully, after which the next identification code is written into the initial address to override the last identification code so as to read the next identification code in the storage unit 2. Further, the recording unit 3 may read the next identification code to be recorded at the initial address of the storage unit 2 before each recording, thus this can guarantee the uniqueness of the identification code recorded into the TFT display module 4. In addition, if the comparison result of the comparison module 34 indicates inconsistency, it represents that the identification code is unsuccessfully recorded into the TFT display module 4, that is, the recorded identification code is not recorded into the corresponding TFT display module 4. At this time, this recorded identification code needs to be recorded into the corresponding TFT display module 4 again, until the recording is successful.

In the embodiment, as shown in FIG. 5, the storage unit 2 may comprise a storage module 21 and a first interface 22 connected with each other. The storage module 21 may store the identification code, and the first interface 22 is connected with the recording unit 3. The recording unit 3 may read the identification code from the storage module 21 via the first interface 22.

In the embodiment, the storage unit 2 may further include a second interface 23 connected with the management unit 1 and the storage module 21, respectively. The management unit 1 may write the generated identification code into the storage module 21 via the second interface 23.

In the embodiment, the storage unit 2 may further comprise a conversion module 24 connected between the second interface 23 and the storage module 21. The conversion module may convert a transmission format and data format of the identification code, written by the management unit 1 via the second interface 23, into formats acceptable to the storage module 21, so that the identification code can be written into the storage module 21.

In the embodiment, the management unit 1 may further read the identification code which is not recorded into the TFT display modules 4 from the storage module 21 via the second interface 23, so that the management unit 1 may recycle (i.e., deleting from the storage module 21) and reuse the identification code which is not recorded into the TFT display modules 4. Accordingly, the conversion module 24 may further convert the transmission format and data format of the identification code read from the storage module 21 into formats acceptable to the management unit 1, so that the identification codes can be read into the management unit 1.

In the embodiment, the management unit 1 may comprise a personal computer (PC) or a single-chip microcomputer. The storage module 21 may include a flash memory chip which can save data even when the power supply fails, to ensure losing no data. The first interface 22 may be an I2C interface, and the second interface 23 may a USB interface. The recording unit 3 and the TFT display module 4 may be connected with each other via an MIPI interface.

The embodiment further provides a recording method based on the above discussed structure of the recording device according to some embodiments of the present invention. As shown in FIG. 6, the method comprises:

step S1: generating an identification code, each identification code identifying a TFT display module, each TFT display module having the identification code which uniquely corresponds to the TFT display module;

step S2: storing the identification codes;

step S3: reading the stored identification codes and recording the identification codes into the TFT display modules.

In the step of reading the stored identification codes and recording the identification codes into the TFT display modules, one of the stored identification codes is read for each time, and the identification code is recorded into the corresponding TFT display module.

Figure 7:
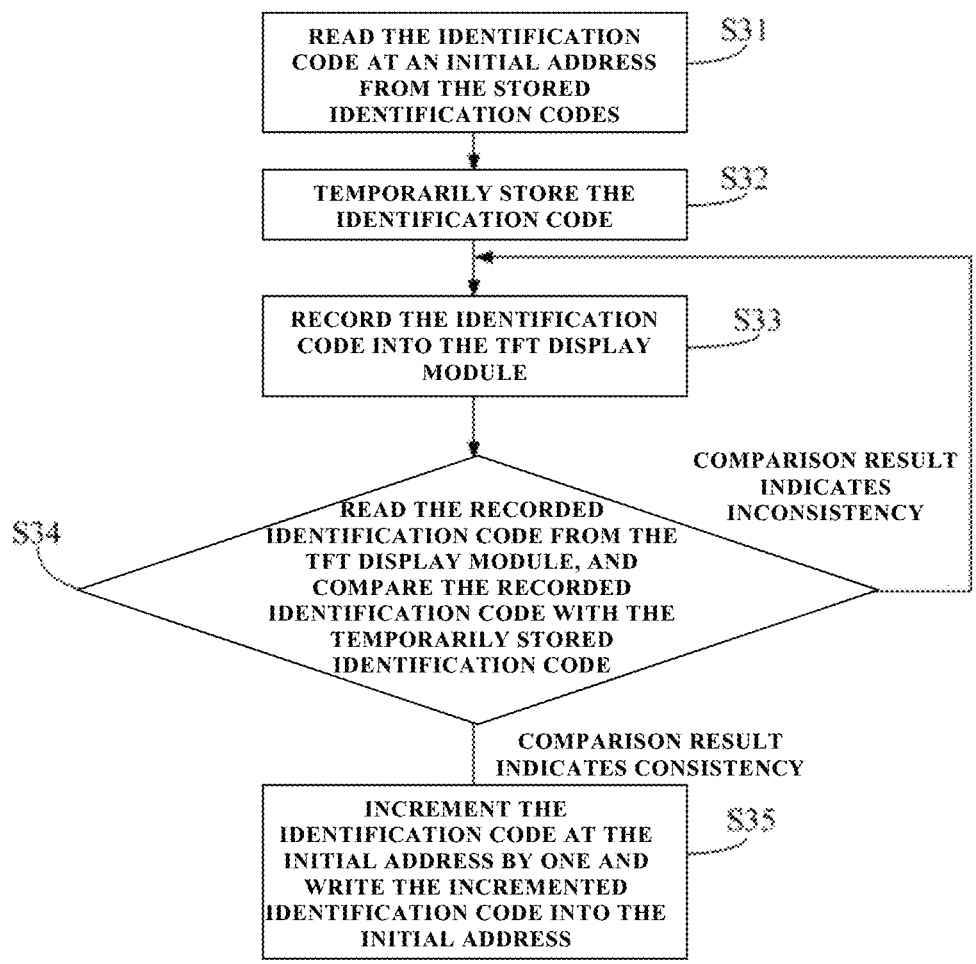
FIG. 7 is a specific flowchart of Step S3 in FIG. 6.

As shown in FIG. 7, the step of reading the stored identification code and recording the identification code into the TFT display module may comprise:

step S31: reading the identification code at the initial address from the stored identification codes;

step S32: temporarily storing the identification code;

step S33: recording the identification code into the TFT display module;

step S35: incrementing the identification code at the initial address by one and writing the incremented identification code into the initial address. In this way, the recording of one identification code is accomplished.

In some embodiments, the step of reading the stored identification code and recording the identification code into the TFT display module may further comprise step S34: reading the recorded identification code from the TFT display module, and comparing the recorded identification code with the temporarily stored identification code, and performing step S35 if the comparison result indicates consistency, and performing step S33 if the comparison result indicates inconsistency, until the identification code is recorded into the same TFT display module (i.e., the identification code is recorded successfully).

As stated above, each identification code may comprise the fixed address of the storage unit and the serial number. Therefore, in the step of storing the identification code, the identification code is stored into the storage unit.

The step of generating identification codes may comprise:
determining a total number of the storage units for storing the identification codes;
allocating the fixed address for each of the storage units;
allocating the serial number to each of the storage units based on the total number of the TFT display modules; and
generating the identification code, which comprises the fixed address of the storage unit which stores the identification code and the serial number of the TFT display module which receives the identification code.

The recording method according to the embodiment of the present invention can record the unique identification code for each TFT display module to achieving uniquely distinguishing of each TFT display module and facilitating tracking and adjustment of parameters, such as color and the like, of an installed TFT display terminal (e.g. a mobile terminal) greatly, and also simplify a large amount of complex marking work and guarantee that the TFT display modules would not be identified mistakenly while saving manpower and material resources.

In some embodiments, the recording method may further comprise: step S4: recycling the identification code which is not recorded into the TFT display module in the stored identification codes. The recycled identification code can be reused because it has not been used yet, that is, the recycled identification code may also be recorded into other TFT display module which is not recorded with the identification code.

The recording device provided by the embodiment of the invention, by arranging the management unit and the storage unit, can record the unique identification code for each TFT display module, to uniquely distinguish different TFT display modules, thereby facilitating tracking and adjustment of the parameters, such as color and the like, of an installed TFT display terminal (e.g. a mobile terminal) greatly. Further the recording device can simplify a large amount of complex marking work and guarantee that the TFT display modules would not be identified mistakenly while saving manpower and material resources.

The recording method provided by the embodiment of the invention can record a unique identification code for each TFT display module, to uniquely distinguish different TFT display modules, thereby facilitating tracking and adjustment of the parameters, such as color and the like, of an installed TFT display terminal (e.g. a mobile terminal) greatly. Further the recording device can simplify a large amount of complex marking work and guarantee that the TFT display modules would not be identified mistakenly while saving manpower and material resources.

Embodiment 2

The embodiment of the present invention provides a recording system, which comprises the recording device according to the embodiment 1.

The recording system utilizes the recording device according to the embodiment 1 to uniquely distinguish different TFT display modules, save manpower and material resources, and improve recording efficiency of the recording system.

It will be understood that the above embodiments are illustrative to explain the principles of the present invention. However the present invention is not limited hereto. Without departing from the spirit and essence of the present invention, various replacement, modifications and variations may be made, which will fall into the scope of the present invention.

The invention claimed is:

1. A recording device for recording an identification code into a thin-film-transistor (TFT) display module, the identification code identifying the TFT display module and uniquely corresponding to the TFT display module, the recording device comprising:
a recording unit, a management unit and a storage unit each separate from the TFT display module, the management unit arranged to generate the identification code and write the identification code into the storage unit, the storage unit arranged to store the identification code, the recording unit arranged to read the identification code from the storage unit and record the identification code into the TFT display module, the identification code including a fixed address of the storage unit storing the identification code and a serial number of the TFT display module receiving the identification code;
wherein the recording unit is arranged to read the identification code from the storage unit during a time that the recording unit is coupled to the TFT display module;
wherein the recording unit includes a read module, a recording module and a write module, wherein the read module is connected with the recording module, the write module is connected with the storage unit, and the read module and the recording module are further connected with the TFT display module,
wherein the read module is arranged to read the identification code at an initial address from the storage unit, and send the read identification code to the recording module;
wherein the recording module is arranged to receive the identification code and record the identification code into the TFT display module; and
wherein the write module is arranged to increment the identification code recorded into the TFT display module by one and write the incremented identification code into the initial address of the storage unit.

2. The recording device according to claim 1, wherein the recording unit further comprises a registration module and a comparison module, wherein the read module is further connected with the registration module and the comparison module and the registration module, the recording module and the write module are connected with the comparison module;
wherein the read module is further arranged to send the identification code read from the storage unit to the registration module when sending the read identification code to the recording module, and the read module is further arranged to read, from the TFT display module, the identification code recorded into the TFT display module, and send the identification code recorded into the TFT display module to the comparison module;
wherein the registration module is arranged to receive and temporarily store the identification code read by the read module, and send the temporarily stored identification code to the comparison module;
wherein the comparison module is arranged to compare the identification code recorded into the TFT display module and the identification code temporarily stored in the registration module, and send a comparison result to the write module and the recording module;
wherein the write module is arranged to increment, if the comparison result indicates consistency, the identification code at the initial address by one, and write the incremented identification code into the initial address;
wherein the recording module is further arranged to record the received identification code into the TFT display module if the comparison result indicates inconsistency.

3. The recording device according to claim 1, wherein the storage unit comprises a storage module and a first interface connected with the storage module, wherein the storage module is arranged to store the identification code, the first interface is further connected with the recording unit, and the recording unit is arranged to read the identification code from the storage module via the first interface.

4. The recording device according to claim 3, wherein the storage unit further includes a second interface connected with the management unit and the storage module wherein the management unit is arranged to write the generated identification code into the storage module via the second interface.

5. The recording device according to claim 4, wherein the storage unit further comprises a conversion module connected between the second interface and the storage module, arranged to convert a transmission format and data format of the identification code written by the management unit via the second interface into formats acceptable to the storage module, so that the identification code can be written into the storage module.

6. The recording device according to claim 5, wherein the management unit is further arranged to read an identification code which is not recorded into the TFT display module from the storage module via the second interface, and the conversion module is further arranged to convert the transmission format and data format of the identification code not recorded into the TFT display module read from the storage module into formats acceptable to the management unit, so that the identification code not recorded into the TFT display module can be read into the management unit.

7. The recording device according to claim 1, wherein the recording device comprises a plurality of storage units including said storage unit and a plurality of recording units including said recording unit, wherein the plurality of the storage units are one-to-one connected with the plurality of the recording units, and the storage units are arranged to store a plurality of identification codes.

8. The recording device according to claim 4, wherein the management unit comprises a personal computer (PC) or a single-chip microcomputer, the storage module includes a flash memory chip, the first interface is an I2C interface, the second interface is a USB interface, and the recording unit and the TFT display module are connected with each other via a mobile industry processor interface (MIPI).

9. The recording device according to claim 7, wherein the management unit includes an address allocation module which is arranged to allocate the fixed address to the storage unit storing the identification code based on a total number of the storage units, and allocate the serial number of the TFT display module to the storage unit storing the identification code based on a total number of TFT display modules.

10. The recording device according to claim 9, wherein the management unit is arranged to check, after all TFT display modules are with corresponding identification codes, whether there is any identification code remaining in the storage units, and the management unit is arranged to recycle the identification code which is not recorded into the TFT display module from the storage units.

11. A recording method comprising:
generating an identification code, the identification code identifying a thin-film-transistor (TFT) display module and uniquely corresponding to the TFT display module;
storing the identification code in a storage unit separate from the TFT display module; and
reading the stored identification code and recording the identification code into the TFT display module, wherein the stored identification code is read during a time that the recording unit is coupled to the TFT display module, by reading the identification code at an initial address from stored identification codes, temporarily storing the read identification code, recording the temporarily stored identification code into the TFT display module, and incrementing the identification code at the initial address by one and writing the incremented identification code into the initial address;
wherein the identification code includes a fixed address of the storage unit storing the identification code and a serial number of the TFT display module receiving the identification code.

12. The recording method according to claim 11, wherein reading the stored identification code and recording the identification code into the TFT display modules further comprises:
recording the written identification code from the TFT display module, comparing the recorded identification code with the temporarily stored identification code, incrementing the identification code at the initial address by one and writing the incremented identification code into the initial address if the comparison result indicates consistency, and recording the temporarily stored identification code into the TFT display module if the comparison result indicates inconsistency.

13. The recording method according to claim 11, further comprising recycling an identification code which is not recorded into the TFT display module.

14. The recording method according to claim 11, wherein generating the identification code comprises:
determining a total number of storage units for storing identification codes;
allocating a fixed address to each of the storage units;
allocating a serial number to each of the storage units based on a total number of TFT display modules; and
generating the identification code.

* * * * *